United States Patent Office 3,072,652
Patented Jan. 8, 1963

---

3,072,652
PREPARATION OF ETHYLIDENE BIS-(N-HETEROCYCLIC) COMPOUNDS
Richard A. Hickner and William W. Bakke, Midland, Mich., and Claude I. Judd, Milwaukee, Wis., assignors to The Dow Chemical Company, Midland, Mich., a corporation of Delaware
No Drawing. Filed Oct. 21, 1959, Ser. No. 847,689
14 Claims. (Cl. 260—244)

The present invention contributes to the organic chemical arts. It has particular reference to an improved method for the manufacture of certain N,N'-ethylidene bis(N-heterocyclic) compounds. The invention is specifically concerned with the preparation, by a new and useful procedure, of certain N,N'-ethylidene bis(cyclic lactam) and N,N'-ethylidene bis(cyclic carbamates) of the general formula:

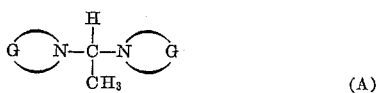

(A)

wherein G is selected from the group of cyclizing bivalent radicals that are biterminally attached to the nitrogens consisting of:

(A1)

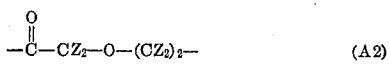

(A2)

and

(A3)

in which each Z is independently selected from the group consisting of hydrogen and alkyl radicals containing from 1 to 10 carbon atoms; $n$ is a integer from 3 to 4 and $m$ is an integer from 2 to 3.

Specifically, the invention is concerned with the preparation of compounds of the respective formulae:

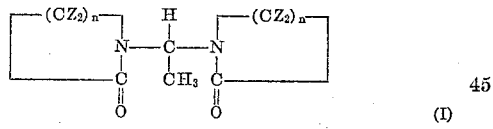

(I)

[N,N'-ethylidene bis(cyclic lactam) compounds]

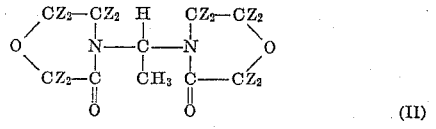

(II)

[N,N'-ethylidene bis(3-morpholinone) compounds]

and

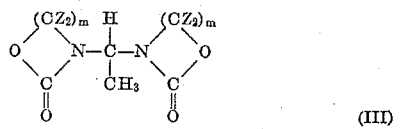

(III)

[N,N'-ethylidene bis(cyclic carbamate) compounds]

wherein Z, $n$ and $m$ are as above defined.

The compounds prepared by the method of the present invention frequently have particular utility and activity in the biological field as anthelmintics, as well as being useful as insecticides, fungicides, bactericides and the like. This is particularly true of those that are prepared from cyclic carbamates, such as N,N'-ethylidene bis(5-methyl-2-oxazolidinone); N,N'-ethylidene bis(2-oxazolidinone); and the like.

The basic object of the present invention is to provide a new and useful method for the manufacture of any and all of the compounds of the Formulae A, I, II and III.

In a copending application by W. E. Walles, W. W. Bakke and W. F. Tousignant, Serial No. 27,286, filed May 6, 1960, there is disclosed a method for the preparation of the above-defined compounds. While that method may be carried out successfully, it does require relatively high temperatures and pressures, with the attendant equipment requirements, and results in yields substantially less than those achievable by the process of the present invention.

In accordance with the practice of the present invention, N,N'-ethylidene bis(N-heterocyclic) compounds of the Formula A and, more specifically, those of the Formulae I, II and III may be prepared by a method which involves the reacting of a corresponding N-heterocyclic starting material with an alkyl vinyl ether at a temperature from about 0° to about 90° C. in the presence of a strong non-oxidizing protonic acid. By using such strong non-oxidizing protonic acids the reaction is substantially instantaneous and the yields are nearly quantitative.

The alkyl (including cycloalkyl) vinyl ether that is employed may contain from 1 to about 10 carbon atoms in the alkyl radical. Ethyl vinyl ether, n-butyl vinyl ether, ethyl cyclohexyl vinyl ether, decyl vinyl ether, methy vinyl ether and the like are typical of the alkyl vinyl ethers that may be suitably employed. Generally, it is preferred to employ a stoichiometric quantity of the vinyl ether, i.e., one equivalent of vinyl ether for every 2 equivalents of N-heterocyclic but an excess of either reactant can be employed, if desired.

As is apparent, the starting cyclic lactam and cyclic carbamates that are employed are of the respective formulae:

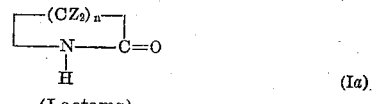

(Ia)
(Lactams)

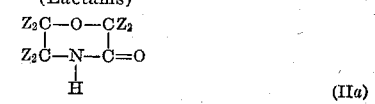

(IIa)
(3-morpholinone)

and

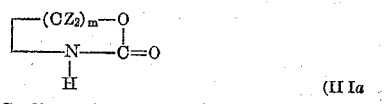

(IIIa)
(Cyclic carbamates)

wherein Z, $n$ and $m$ have the above described values.

The preparation of 3,3'-ethylidene bis(N-heterocyclic) of the present invention from a N-heterocyclic compound and an alkyl vinyl ether is represented by the following equation:

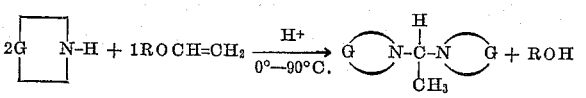

wherein G is as defined above and R is an aliphatic or cycloalkyl containing from 1 to 10 carbons.

Strong non-oxidizing protonic acids operable in the present invention include hydrochloric, sulfuric, trichloroacetic, alkali metal bisulfate, ammonium bisulfate and the like. Generally, an amount of the acid from about .1 to about 10 percent by weight, based on the weight of the starting N-heterocyclic reactant material is sufficient for accomplishing the reaction. Preferably, the amount of the acid employed is only that which is necessary to achieve initiation of the reaction as is evidenced by an increase in the temperature of the reaction system. Usually, relatively greater quantities of acid must be employed when the reaction is performed by batchwise techniques instead of according to continuous processing arrangements. Regardless of the specific protonic acid employed, care should be taken to avoid the occurrence of such excessively acid conditions in the reaction mass as may cause degradation and decomposition of the starting materials.

When liquid starting materials are employed, the ethylidene linking reaction will proceed satisfactorily without the presence of a solvent. However, an inert, low boiling solvent vehicle may be employed, if desired, in the reaction mixture. The use of a solvent will facilitate the removal of heat from the reaction mixture. Suitable solvents include, for example, benzene, methylene chloride, and dioxane.

The reaction can be accomplished over a temperature range from about 0° to 90° C. but preferably it is conducted at themperatures from about 40° to 50° C. Higher temperatures tend to cause a discoloration of the reaction mixture while lower temperatures are necessarily difficult to maintain due to the exothermic nature of the reaction.

Pressures upon the reaction system have little or no effect on the reaction rate, but in instances where an inert solvent is employed, capacity to regulate the pressure may be utilized to advantage to regulate the temperature of the reaction.

Ordinarily, very good conversions and yields of desired product from the starting materials can be nearly instantaneously realized according to the method of the present invention. Reaction periods of one hour or less are satisfactory in all cases. The precise yields to be obtained, of course, may oftentimes be found to vary with the particular starting material utilized and the N,N'-ethylidene bis(N-heterocyclic) compound desired, but generally yields as great as 80 percent are obtained.

As will be apparent to those who are skilled in the art, the desired N,N'-ethylidene bis(N-heterocyclic) products can be recovered easily from the reaction mass using techniques best adapted to individual needs and calculated to suit the individual properties and characteristics of the material being isolated. Ordinarily, since the products made by practice of the present invention are generally high melting solids (i.e., usually having melting points of at least 150° C.) they may be isolated and recovered from the reaction mass easily by permitting them to crystallize and precipitate therein (as upon cooling of the reaction mass) and then recovering them therefrom by filtration, decantation, centrifugation, etc. It may also be possible to recover the products from the reaction mass by solvent extraction. In many cases it is advantageous, prior to recovery of the desired products, to subject the reaction mass to stripping or distillation in order to remove fugacious constituents therefrom, such as certain unreacted starting materials and certain N-vinyl monomers of the starting materials which may also form in the reaction. After recovery from the reaction mass, the products may be further purified with advantage by recrystallization from suitable solvents, etc.

The following examples are illustrative of the present invention and should not be construed as limiting:

*Example I*

A reaction vessel consisting of a one liter round bottom flask was fitted with a sparging tube, thermometer, condenser and magnetic stirrer. Pyrrolidinone (102 grams; 1.2 moles), n-butylvinyl ether (60 grams; 0.6 mole), and dry benzene (50 milliliters) as a solvent were charged into the reaction vessel. After stirring had been started, anhydrous hydrogen chloride in an amount sufficient to initiate the reaction was sparged into the reaction system. The temperature rose rapidly from 23° C. to 32° C. Three drops of concentrated sulfuric acid were then added and again the temperature rose rapidly. The reaction system was cooled externally to maintain the temperature of the reaction system below 45° C. Stirring was continued throughout the reaction and until the reaction mass had cooled to room temperature. Most of the benzene was removed from the products by drying them in a stream of air. Upon cooling to 0° C. the reaction mass solidified and the product was collected by filtration in a vacuum funnel and dried in an oven. The yield of ethylidene bispyrrolidinone was 66 grams which is about 56 percent of the theoretical yield based on the pyrrolidinone starting material.

*Example II*

An assembled reaction vessel similar to that of Example I was charged with 5-methyl-2-oxazolidinone (101 grams; 1.0 mole), n-butylvinyl ether (50 grams; 0.5 mole) and dry benzene (100 milliliters) as a solvent. After stirring had been started, a catalytic amount of anhydrous hydrogen chloride was sparged into the reaction system whereupon the temperature rose from 23° C. to 38° C. The reaction system was cooled externally to maintain the temperature below 40° C. Stirring was continued throughout the reaction and until the reaction mass had cooled to room temperature. The product which had solidified during the cooling process, was separated by filtration and washed with ethanol. After air drying, the 3,3'-ethylidene bis-(5-methyl-2-oxazolidinone) product weighed 84 grams which is about 74 percent of the theoretical yield based upon the 5-methyl-2-oxazolidinone starting material.

*Example III*

An assembled reaction vessel similar to that employed in foregoing examples was charged with 5-methyl-2-oxazolidinone (505 grams; 5.0 moles) and ethylvinyl ether (248 grams; 3.44 moles). After stirring had been started, a catalytic amount of anhydrous hydrogen chloride was sparged into the system. The reaction mixture refluxed at approximately 36° C. and after a few minutes the reaction mixture turned dark and continued to reflux vigorously with the temperature reaching 80° C. Upon cooling to room temperature, the reaction mass was filtered and 329 grams of crude solid product were recovered. Upon standing overnight, an additional 100 grams of solid product precipitated. Recrystallization from an acetone-ethanol solution gave a white solid having a melting point range of 223–225° C. The yield of the crude 3,3'-ethylidene bis(5-methyl-2-oxazolidinone) was 75 percent of the theoretical yield based on the 5-methyl-2-oxazolidinone starting material.

In a manner similar to that of the foregoing examples, other ethylidene-bis-lactams and ethylidene-bis-carbamates can be prepared in comparable yields by substituting for the N-heterocyclic starting materials in the foregoing examples such compounds as 2-oxazolidinone, 5-ethyl-2-oxazolidinone, 4,5-dimethyl - 2 - oxazolidinone, 5-butyl-2-oxazolidinone, 4,5-diethyl - 2 - oxazolidinone, 2-oxazinidinone, 6-methyl - 2 - oxazinidinone, 3-morpholinone, lower alkyl ring substituted 3-morpholinone, 5-methyl pyrrolidinone, 3,3'-dimethyl pyrrolidinone, 3,3'-dimethyl piperidinone and the like compounds.

Results comparable to those achieved in the foregoing examples can be obtained by substituting for the alkyl vinyl ethers used therein, an alkyl vinyl ether such as ethylcyclohexyl vinyl ether, decyl vinyl ether, propyl vinyl ether, methyl vinyl ether and the like.

It is obvious from the foregoing that modifications may be made in the present invention without departing from the spirit and scope thereof and it should be understood that the invention is limited only as defined in the following claims.

We claim:

1. Method for the preparation of N,N'-ethylidene bis- (N-heterocyclic) compounds selected from the group of those having the structural formulae:

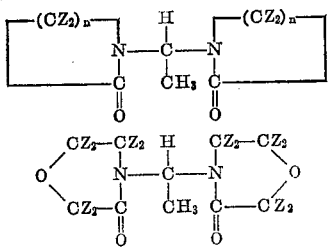

(I)

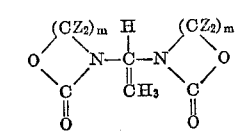

(II)

and

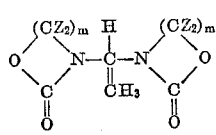

(III)

wherein Z is selected from the group consisting of hydrogen and alkyl radicals of from 1 to about 4 carbon atoms; $n$ is an integer from 3 to 4 and $m$ is an integer from 2 to 3; which method comprises mixing a starting material selected from the group of cyclic lactams, 3-morpholinone and cyclic carbamates consisting of those having the structural formulae:

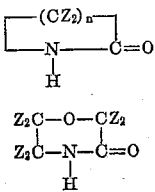

(Ia)

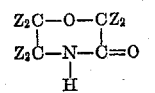

(IIa)

and

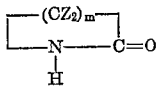

(IIIa)

wherein the values of Z, $n$ and $m$ are the same as in the Formulae I, II and III, with an alyl vinyl ether that contains from about 1 to 10 carbon atoms in the alkyl group, in the presence of about .1 to 10 weight percent based on the weight of the reactant mixture of a strong non-oxidizing protonic acid, while maintaining the mixture at a temperature from about 0° C. to about 90° C. until at least a portion of said starting material of the Formulae Ia, IIa and IIIa has been converted to an N,N'-ethylidene bis(N-heterocyclic) compound; and subsequently removing the thereby obtained N,N'-ethylidene bis(N-heterocyclic) compound of the Formulae I, II and III from the reaction mixture.

2. The method of claim 1, wherein said product is removed from the reacted mixture by cooling said mixture to a temperature beneath the crystallization point of said product and filtering the product from said mixture.

3. The method of claim 1, and including in addition thereto and in combination therewith, the step of mixing said reactant materials and said strong non-oxidizing protonic acid in an inert solvent vehicle and performing the reaction in the resulting mixture.

4. The method of claim 1, wherein said starting material is 2-oxazolidinone and said product is N,N'-ethylidene bis(2-oxazolidinone).

5. The method of claim 1, wherein said starting material is 5-methyl-2-oxazolidinone and said product is N-N'-ethylidene bis(5-methyl-2-oxazolidinone).

6. The method of claim 1, wherein said starting material is 5-ethyl-2-oxazolidinone and said product is N,N'-ethylidene bis(5-ethyl-2-oxazolidinone).

7. The method of claim 1, wherein said starting material is 2-oxazinidinone and said product is N,N'-ethylidene bis(2-oxazinidinone).

8. The method of claim 1, wherein said starting material is 3-morpholinone and said product is N,N'-ethylidene bis(3-morpholinone).

9. The method of claim 1, wherein said starting material is 2-pyrrolidinone and said product is N,N'-ethylidene bis(2-pyrrolidinone).

10. The method of claim 1, wherein said starting material is 2-piperidinone and said product is N,N'-ethylidene bis(2-piperidinone).

11. The method of claim 1, wherein said alkyl vinyl ether is ethyl vinyl ether.

12. The method of claim 1, wherein said alkyl vinyl ether is n-butyl vinyl ether.

13. The method of claim 1, wherein said alkyl vinyl ether is ethylcyclohexyl vinyl ether.

14. Method for the preparation of N,N'-ethylidene bis-(N-heterocyclic) compounds of the formula:

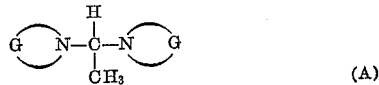

(A)

wherein G is selected from the group of bivalent radicals consisting of those having the structure:

(A1)

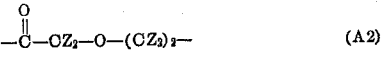

(A2)

and

(A3)

in which each Z is independently selected from the group consisting of hydrogen and alkyl radicals containing from 1 to about 4 carbon atoms; $n$ is an integer from 3 to 4 and $m$ is an integer from 2 to 3; which method comprises mixing a starting material selected from the group of those having the structural Formulae A1, A2 and A3 with an alkyl vinyl ether that contains from about 1 to 10 carbon atoms in the alkyl group in the presence of a strong non-oxidizing protonic acid but under acidic conditions of a degree insufficient to decompose said starting material; while maintaining and heating the mixture at a temperature between about 0° C. and 90° C. until at least a portion of said starting material of the Formulae A1, A2 and A3 has been converted to an N,N'-ethylidene bis-(N-heterocyclic)product; and subsequently removing the thereby obtained N,N'-ethylidene bis(N-heterocyclic) compound of the Formula A from the reacted mixture.

References Cited in the file of this patent

UNITED STATES PATENTS 2,891,058    Walles et al. _____ June 16, 1959

OTHER REFERENCES

Shostakovskii: Chem. Abstracts, vol. 49, page 1309[5] (1955).